Aug. 9, 1960     H. J. MODREY     2,948,383
CARRIER, ESPECIALLY FOR RADIOACTIVE LOADS
Filed April 11, 1958     3 Sheets-Sheet 2

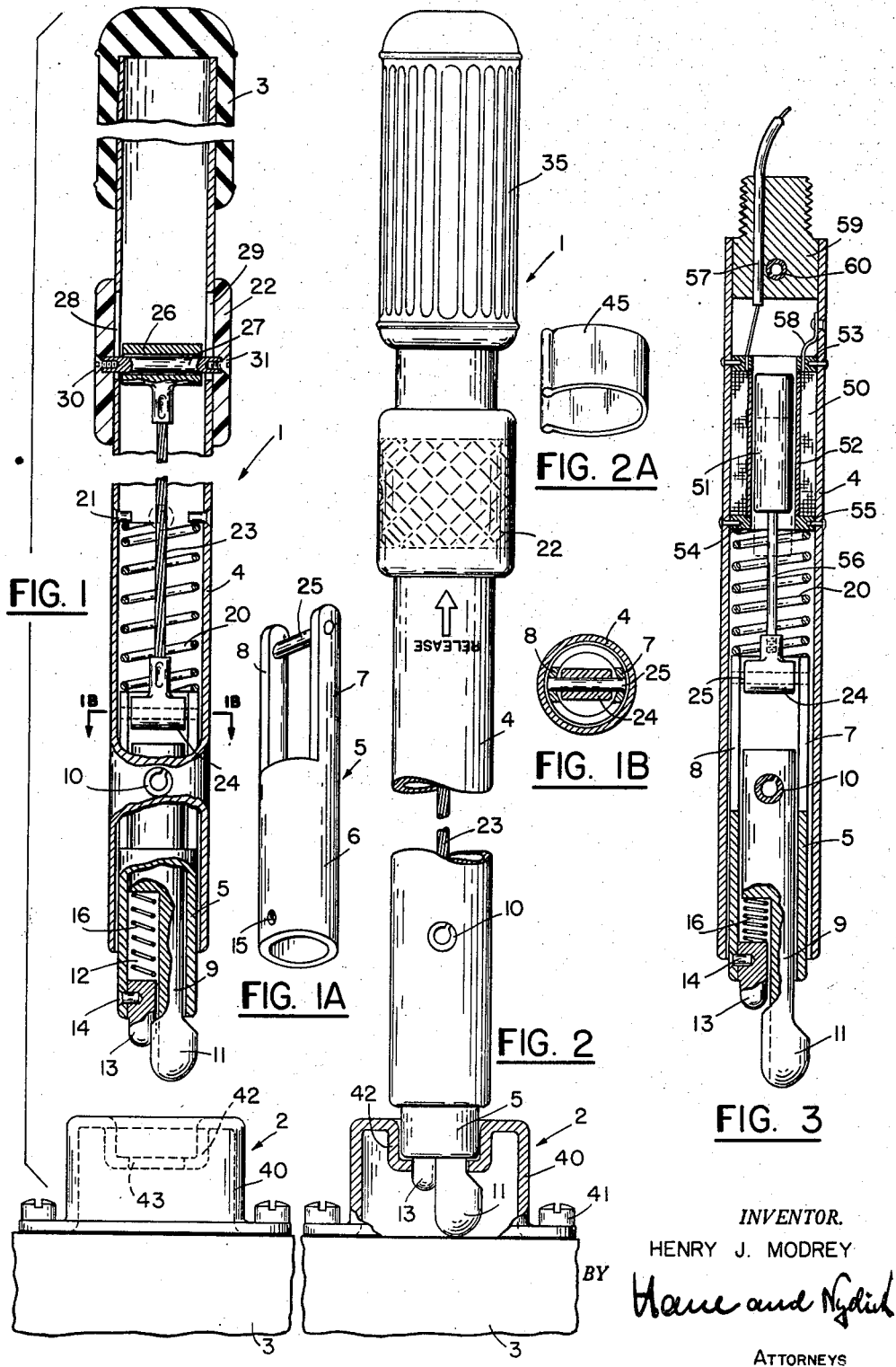

*INVENTOR.*
HENRY J. MODREY
BY
ATTORNEYS

Aug. 9, 1960     H. J. MODREY     2,948,383
CARRIER, ESPECIALLY FOR RADIOACTIVE LOADS
Filed April 11, 1958     3 Sheets-Sheet 3

INVENTOR.
HENRY J. MODREY
BY
*Hane and Nydick*
ATTORNEYS

United States Patent Office 2,948,383
Patented Aug. 9, 1960

2,948,383

CARRIER, ESPECIALLY FOR RADIOACTIVE LOADS

Henry J. Modrey, Eagle Drive, Stamford, Conn.

Filed Apr. 11, 1958, Ser. No. 727,894

16 Claims. (Cl. 198—179)

The present invention relates to a remote controlled load carrier assembly, and more particularly, to a load carrier assembly designed to transport a load from a loading station to a release station.

While the load carrier assembly of the invention is useful for the transportation of a great variety of loads, it affords particularly significant advantages in connection with the transportation of a load that is inherently dangerous, such as a load containing radioactive material.

Accordingly, one of the principal objects of the invention is to provide a novel and improved load carrier assembly which incorporates several coacting or complementary safety features that make virtually impossible the accidental release of a load in transit due to a failure of the carrier.

Another object of the invention is to provide a novel and improved load carrier which can be locked to the load and released therefrom without requiring direct handling of the load, or even a close approach to the load. This capability makes the load carrier not only highly suitable for the transportation of inherently dangerous loads, but also greatly facilitates the lifting of a load from a location difficult of access such as an atomic pile.

Still another object of the invention is to provide a novel and improved load carrier the locking mechanism of which is so designed that the load must either be positively locked to the carrier, or cannot be lifted at all as the carrier will slip out of the load if not fully locked when an attempt is made to lift the load. Such preclusion of the lifting of a load which is only incompletely and thus unsafely locked to the carrier effectively prevents the unintentional dropping of the load while in transit.

Another object of the invention, related to the next preceding one, is to provide a novel and improved load carrier with an electrically operated release mechanism so designed that the load will remain locked to the carrier even if the electric power supply for the release mechanism is interrupted for any reason. This fail-safe feature fully protects against a premature release of the load due to power failure.

A further object of the invention is to provide a novel and improved load carrier which is shock and vibration resistant for all practical purposes. This important advantage is due to the fact that the component controlling both the locking and the release of the load is of such a small mass that it will not be materially affected by shocks and vibrations to which the loaded carrier may be subjected.

Still a further object of the invention is to provide a novel and improved load carrier in which certain components that are essential for the functioning of the locking mechanism are duplicated in a parallel acting arrangement such that both components independently contribute to the functioning of the locking mechanism whereby a failure of one of the components does not cause a failure of the locking mechanism as such.

A still further object of the invention is to provide a novel and improved load carrier which is simple and rugged in design, inexpensive in manufacture and the operation of which both as to the lifting and the release of the load does not require any special skill or training on the part of the operator.

Still another object of the invention, allied with the preceding ones, is to provide a novel and improved conveyor system in which load carriers of the kind above referred to, are arranged to travel between one or several loading stations and one or several release stations to lift a load at a loading station by means of a loading mechanism automatically operated when an empty carrier arrives in that station and to carry the load to a release station where it is released by means of a discharge control acting upon the release mechanism of the carrier also automatically operated by the arrival of a loaded carrier.

Other and further objects, features and advantages of the invention will be pointed out hereinafter and set forth in the appended claims constituting part of the application.

In the accompanying drawing, several preferred embodiments are shown by way of illustration and not by way of limitation.

In the drawing:

Fig. 1 is an elevational sectional view of a load carrier according to the invention with a mechanically operated release mechanism, the carrier being shown separated from a receiver at the load.

Fig. 1A is a perspective view of one of the components of the carrier.

Fig. 1B is a section on line 1B—1B of Fig. 1.

Fig. 2 is an elevational view of the carrier according to Fig. 1, the carrier being shown locked to a receiver at the load.

Fig. 2A shows a safety clip that may be used in connection with the carrier according to Figs. 1 and 2.

Fig. 3 is a sectional view similar to Fig. 1 but with an electrically actuated release mechanism for the carrier.

Figure 4:
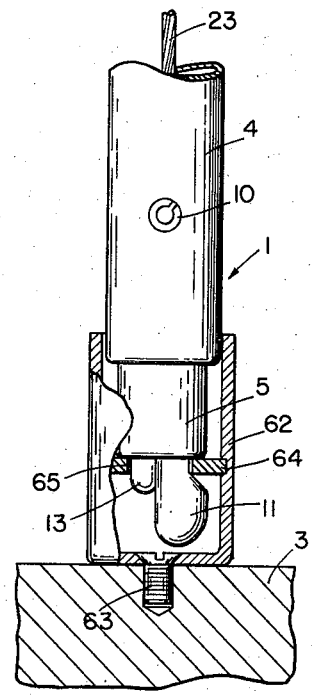
Fig. 4 is a fragmentary view, partly in section, of a modification of the locking mechanism of the carrier, the carrier being shown locked to the receiver at the load.

Referring now in detail to the load carrier assembly according to Figs. 1 through 2A, the load carrier assembly according to these figures comprises a load carrier 1 and a receiver 2 which may comprise a member secured to the load or be formed directly on the load as will be more fully explained hereinafter. The nature and configuration of the load itself are without importance to the understanding of the invention. The load is indicated by an outline 3 and may be visualized as a vessel containing radioactive material.

The exemplified load carrier 1 comprises an outer sleeve or tube 4 made for instance of thin gauge metal, and an inner sleeve 5, the configuration of which can best be seen in Fig. 1A. As shown in this figure, the sleeve has a cylindrical part 6 from the upper end of which extend two diametrically opposite extensions 7 and 8. Sleeve 5 is axially slidable relative to outer tube 4 and houses a clamping rod 9. This clamping rod is secured at its upper end to tube 4 by any suitable means shown as a rivet or roll pin 10 of a strength sufficient for the weight of the loads to be carried. The lower end of the clamping rod, that is, the end protruding from sleeve 5 is enlarged to form a clamping head 11 one-sidedly overhanging the peripheral outline of rod 9. The tip of the clamping head is rounded to facilitate insertion thereof into the receiver as will be more fully explained hereinafter. As is apparent, tube 4 constitutes functionally an extension of the clamping rod and hence, for certain applications a separate outer tube may be omitted. The side of the clamping head opposite to the overhanging part thereof and the corresponding side of rod 9 proper are longitudinally recessed at 12 to receive a locking rod or slide 13. The locking slide is secured to a sleeve 5 by means of a screw or pin 14 which penetrates through a bore 15 provided in sleeve 5 for this purpose. A coil spring 16 is fitted in recess 12 abutting with one end against the slide and with the other end against the base of the recess.

As is apparent, sleeve 5 and with it slide 13 are axially slidable relative to the clamping head and tube 4 whereas the clamping rod and its head are fixed relative to tube 4. Spring 16 presses slide 13 and with it sleeve 5 into the direction toward the clamping head, that is, downwardly as shown in the figures. Sleeve 5 and slide 13 are urged into this direction by a second coil spring 20 also. This spring abuts at one end against the upper edges of sleeve extension 7 and 8 and at the other end against projections provided in tube 4 and shown as rivets 21. The two springs act in parallel and thus complement each other. They are so designed that if one of the springs should fail, the other will still urge the slide toward the clamping head thereby assuring functioning of the locking means.

To withdraw sleeve 5 into tube 4 and hence slide 13 relative to clamping head 11, the sleeve is connected to a ring 22 which in turn is slidable on tube 4. The connection between sleeve 5 and ring 22 is shown by way of example as comprising a wire rope 23 one end of which is swaged into a T-piece 24 which is secured to the sleeve extensions 7 and 8 by a pin 25. The other end of the wire rope is swaged into a similar T-piece 26 through which is extended a pin 27. Both ends of pin 27 protrude from tube 4 through longitudinal slots 28 and 29 and into ring 22. Pin 27 is secured to ring 22 by countersunk screws 30 and 31 which penetrate into the face of pin 27, or by any other suitable means. A preferably deeply grooved grip 35 made of rubber or other suitable material is tightly fitted upon the upper end of tube 4. In a simplified construction wire rope 23 may be led out of tube 4 and pulled directly or by means of a lever. In such construction, ring 22, T-piece 26 and grip 35 are omitted.

Receiver 2 is shown as comprising a flanged cup 40 which is secured to load 3 by any suitable means shown as screws 41. The upwardly facing bottom of the cup is recessed to form a similar smaller cup 42. The diameter of cup 42 fits the diameter of sleeve 5 and the cup has in its bottom a receiver opening 43. The peripheral outline of the receiver opening fits the maximum peripheral outline of clamping head 11 only which is substantially equal to the maximum diameter of the combined peripheral outline of slide 13 and clamping rod 9 just above the clamping head as seen in the figures.

As will become more apparent from the subsequent description, the functionally essential features of the receiver are the receiver opening and its dimensions in relation to the peripheral outlines of the slide, the clamping head and the clamping rod. It is further essential that there be sufficient clearance below the receiver opening and the wall in which it is formed to accommodate the clamping head and the slide in the manner shown in Fig. 2. Accordingly, the receiver may take any configuration as long as the aforementioned requirements are satisfied. It is also apparent that the receiver may consist of simply an opening in a wall portion of the load proper, provided only that there is free space below the opening to accommodate the clamping head and the slide.

The operation of the load carrier as hereinbefore described is as follows: When the load carrier 1 is separated from the receiver all the components of the carrier 1 will occupy the positions shown in Fig. 1 by the action of springs 16 and/or 20. Let it now be assumed that it is desired to lift the load 3, or in other words to lock carrier 1 to receiver 2. To this end, the operator grips handle 35 and inserts the clamping head, or more specifically the protruding rounded tip thereof into receiver opening 43 and presses the load carrier against the receiver, that is, downward as shown in Figs. 1 and 2. As a result, the clamping head will penetrate into the receiver opening, but slide 13 will be pressed backward relative to the clamping head as there is no space available for the slide in the receiver opening when and while the clamping head occupies the said opening. Springs 16 and 20 permit such backward movement of the slide 13 which will move deeper into tube 4 together with sleeve 5. The displacement of sleeve 5 will be taken up partly by flexing of rope 23 and partly by an upward movement of ring 22 in slots 28 and 29. When the clamping head has fully passed through the receiver opening, it will perform a slight lateral movement from its position substantially coaxial with the receiver opening which is in the position shown in Fig. 2. As soon as the clamping head has approximately reached this position, space becomes available for the slide in the receiver opening and the slide will follow the clamping head into said opening by the combined action of springs 16 and/or 20, or of only one of the springs if the other should fail, and the forward end of sleeve 5 will move into cup 42. All the components now occupy the positions shown in Fig. 2 which is the locking position of the load carrier. As is apparent, the clamping head is held in its position underlying the rim of the wall forming the receiver opening by the locking slide and the load carrier is steadied by the penetration of sleeve 5 into cup 42. The strength of the locking action with which the clamping head is retained in the receiver opening is determined by the shear strength of the clamping head and the tensile strength of the wall portion in which the receiver opening is formed. It can, therefore, be varied by appropriate choice of materials, or by an increase in the dimensions of the clamping head and the receiver plate.

As is further evident, if one of springs 16 and 20 should break, the function of the carrier is not materially affected since the remaining spring will urge the locking slide into the required position. Either spring can be omitted without affecting the design and the function of the carrier.

In order to release the load from carrier 1, the operator pulls ring 22 upwardly, that is, toward grip 35, against the action of springs 16 and 20. As a result, locking slide 13 is retracted from receiver opening 43 thereby making space available for a lateral displacement of clamping head 11 into the position in which it can be withdrawn from the receiver opening.

As is apparent, the position of slide 13 relative to the clamping head controls both the locking and the release of the carrier. The mass of the slide is comparatively insignificant. Consequently, the slide will not be materially affected by shocks and vibrations to which the carrier may be subjected when carrying a load. As a result, there is no appreciable danger that the slide will be moved into its release position due to shocks and vibrations. In other words, the carrier is shock and vibration resistant for all practical purposes.

To prevent an accidental release of the load by the operator gripping ring 22 when reaching for or holding grip 35, a safety clip 45 may be provided. This clip is preferably springy and fits between the lower rim of grip 35 and the upper rim of ring 22 when the latter is in the position of Fig. 2. As is evident, the clip blocks an upward movement of ring 22, but can be readily removed when it is intended to release the load.

Tube 4 may have any length, limited only by practical considerations. This permits the location of the points at which the carrier is manipulated, that is grip 35 and ring 22, at a safe distance from the load and also permits convenient access to a load which may for instance be located in a deep or narrow vessel or container such as an atomic pile.

As is apparent from the previous description of the functioning of the carrier assembly, the axis of the longitudinal axis of the carrier as a whole, or more specifically of tube 4 is eccentric relative to the receiver opening when and while the clamping head passes through said opening. It is forced into and guided in such eccentric position by the clamping head in conjunction with the receiver opening which thus constitute guide means. Upon completion of the passage of the clamping head through the receiver opening the carrier is forced by the pressure of the slide sideways from its eccentric position into a centric position relative to the receiver opening. The slide thus constitutes a centering means. Due to its centering action, the slide controls the locking and also the release of the carrier as previously described.

Fig. 3 shows a load carrier arrangement which has the same locking mechanism as formed by clamping head 11 and locking slide 13 in the arrangement of the previously described figures. The release mechanism is also in principle the same. Accordingly, corresponding parts are designated by the same reference numerals. However, while according to Figs. 1 and 2, release sleeve 5 is retracted from the locking position by mechanical means, it is retracted according to Fig. 3 by electro-magnetic means. These means comprise a solenoid coil 50 secured within the outer tube or sleeve 4 and a core 51 axially slidable within coil 50. A shielding liner 52 made of brass is preferably interposed between the coil and the core. The coil is held in position by end plates 53 and 54 secured to tube 4 by suitable means such as rivets 55. The lower end plate serves as an abutment for the upper end of spring 20, that is, plate 54 corresponds in function to rivets 21 of Fig. 1. Core 51 is mounted on a rod 56 which is secured for instance by a screw connection to T-piece 24. One terminal of coil 50 is connected to a wire 57 and the other is connected to the wall of tube 4 by a wire 58. Wire 57 is led out of tube 4 and secured therein by any suitable means shown as a roll pin 60. The entire assembly shown in Fig. 3 may have a grip or handle as shown at 35 in Figs. 1 and 2 from which the control wire would emerge, or it may be secured by means of bushing 59 to a support as will be more fully described hereinafter.

Coil 50 is shown energized. As a result core 51 is lifted into its uppermost position so that sleeve 5 and with it locking slide 13 are retracted relative to the clamping head 11. The de-energized position of the core is indicated by dotted lines. When the core is in the latter position, sleeve 5 and locking slide 13 will occupy the positions shown in Fig. 1.

Fig. 4 shows the lower part of a load carrier member 1 of the kind shown in detail in Fig. 1. However, a load carrier of the kind shown in Fig. 3, that is, with an electrically operated release may also be used in the arrangement of Fig. 4. This figure shows a receiver design which is especially suitable when it is important to steady tube 4 which may be of considerable length relative to the load. According to Fig. 2 the tube 4 is steadied by insertion of sleeve 5 in the comparatively shallow cup 42. To pervent possible wobbling of the tube 4 when locked to the load in a more effective manner, the receiver of Fig. 4 comprises a receiver sleeve 62 which is open at its receiving end or throat portion and secured to the load 3 by any suitable means, shown as a screw 63. A receiver plate 64 which has a receiver opening 65 is fixedly secured within receiver sleeve 62. Clamping head 11 and locking slide 13 coact with the receiver plate and the receiver opening in the same manner as has been previously described. The longitudinal distance between receiver plate 64 and the upper rim of sleeve 62 is such that tube 4 will enter into and fill sleeve 62 when the clamping head and the slide occupy the illustrated locking position. As is apparent, the throat portion of receiver sleeve 62 constitutes a support for tube 4 so that the same will be effectively steadied.

To provide space for the deep insertion of the carrier in the receiver as shown in Fig. 4, and the resulting steadying of the carrier in the receiver the depth of the throat portion of the receiver as limited by receiver plate 64 must exceed the projection of the slide from the bottom edge of sleeve 4. As is apparent sleeve 4 constitutes an auxiliary guide means in the design of Fig. 4.

Figure 5:
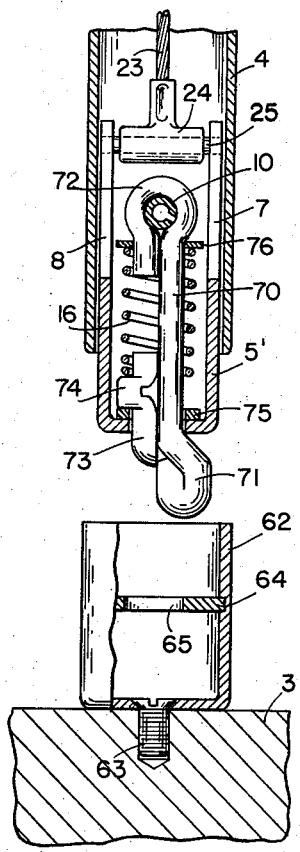
Fig. 5 is a fragmentary sectional view of another modification of the locking mechanism, the carrier being shown separated from the receiver at the load.

The load carrier arrangement of Fig. 5 shows a locking mechanism which is similar in principle to the previously described locking mechanism but different in structure. The clamping rod 9 and clamping head 11 of the previous figures are replaced by a wire rod 70 of semi-circular cross section. Rod 70 is bent back at its lower end to form a one-sidedly overhanging clamping head 71 similar in function to clamping head 11. The opposite end of the wire rod is bent to form a loop 72 through which is extended roll pin 10 to secure the clamping rod to tube 4. The locking slide 73 is also formed by a suitably bent and shaped wire rod of the same semi-circular cross-section, but facing oppositely. The locking slide has a shoulder 74 which serves to retain the slide within sleeve 5', the lower end of which is closed in this design by an apertured wall member. A washer 75 may be interposed between the slide shoulder 74 and the end wall of sleeve 5'. Shoulder 74 also serves as an abutment for one end of spring 16, the other end of which abuts against a washer 76 fitted upon the clamping rod. The mechanism for retracting sleeve 5' and with it slide 73 relative to the clamping head is shown in part only and should be visualized as being similar to that shown in Fig. 1. However, it may also be of the electrically operated kind shown in Fig. 3.

The receiver for the load carrier is of the deep insertion type shown in Fig. 4 but it may also be of the shallow cup type shown in Figs. 1 and 2, or the receiver may be formed directly in the load as may also be the receiver in the arrangement of Fig. 4.

The function of the carrier will be evident from the previous description.

Figure 6:
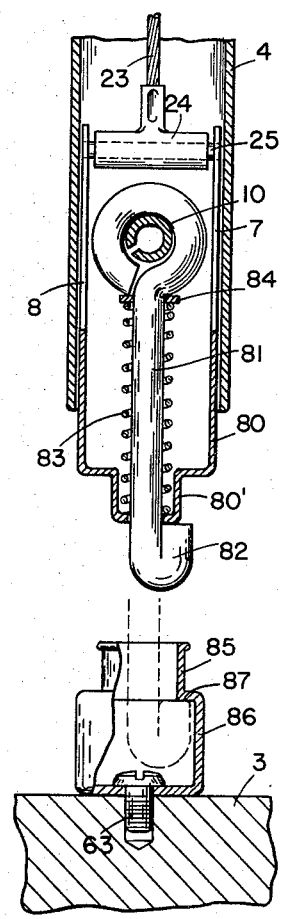
Fig. 6 is a fragmentary sectional view of still another modification of the locking mechanism, the carrier being shown separated from the receiver at the load.

Fig. 6 shows a load carrier design in which the locking mechanism is further modified. The centering means constituted in the previously described figures by the locking slide 13 or 73 consists in the design of Fig. 6 of a tubular extension 80' of inner sleeve 80. This tubular extension is closed at its end by an apertured end wall through which extends clamping rod 81. This rod is formed of a wire rod of circular cross-section and bent back at its end protruding from tubular portion 80' to form a clamping head 82 one-sidedly overhanging the clamping rod and the peripheral outline of the tubular portion 80'. At the opposite end, the rod is bent to form a loop through which is extended roll pin 10 to secure the clamping rod to tube 4. A coil spring 83 abutting at one end against the loop portion of clamping rod 81, or an interposed washer 84 urges the clamping rod into the shown position in which the clamping head rests against the outside of the end wall of tubular portion 80'. The mechanism for retracting sleeve 80 relative to the clamping rod is of the kind shown in Fig. 1, but it may also be of the electrically operated kind shown in Fig. 3.

The receiver coacting with the load carrier of Fig. 6 comprises a tubular or throat portion 85. The peripheral outline of this portion fits the peripheral outline of tubular portion 80', and its axial length may be slightly in excess of that of tubular portion 80' for a reason which will be more fully explained hereinafter. Portion 85 is continued in a widened tubular portion 86 so that the two portions are joined by a shoulder 87. The parts of the receiver which are essential for the functioning of the mechanism are the tubular portion 85 and the shoulder 87 at its lower rim. Tubular portion 86 need not have any specific configuration. Its sole function is to provide space for the clamping head. It may be omitted altogether and tubular portion 85 may take the shape of a ring of a width and depth as previously described and supported sufficiently spaced from the next adjacent component. The receiver as shown is secured to the load by any suitable means such as screw 63 but it can also be formed directly in the load.

To lock the load carrier to the receiver, clamping head 82 is inserted into tubular portion 85 and the load carrier is pressed against the receiver, that is, downwardly as shown in the figures. When the clamping head has fully passed through tubular portion 85, space becomes available for tubular portion 80'. This portion follows the clamping head into portion 85 by action of springs 83 and/or 20. At the same time, the clamping head performs a slight lateral movement so that it underlies shoulder 87 as is shown in dotted lines. This latter position of the clamping head constitutes the locking position thereof and it is secured in this position by the tubular portion 80' occupying tubular portion 85. Due to the aforedescribed excess length of portion 85 it cannot return into its position abutting against the bottom wall of portion 80', but is retained slightly protruding therefrom. As a result spring 83 remains somewhat tensioned thereby holding the clamping head tightly in the receiver.

To release the load carrier from the receiver, sleeve 80 is retracted into tube 4 as previously described. When the tubular portion 80' leaves tubular portion 85 the clamping head is released and can be withdrawn through portion 85.

The clamping head 82 in conjunction with receiver portion 85 again constitute guide means for guiding the carrier eccentrically relative to the receiver during insertion of the carrier in the manner previously described. The centering means constituted in the aforedescribed exemplifications of the invention by the locking slide, are formed in the design of Fig. 6 by sleeve portion 80' which when entering the tubular receiver portion 85 forces the carrier from its eccentric position relative to the receiver opening into its centric position and the clamping head from its centric position relative to receiver portion 85 into the eccentric dotted line position underlying shoulder 87.

Figure 7:
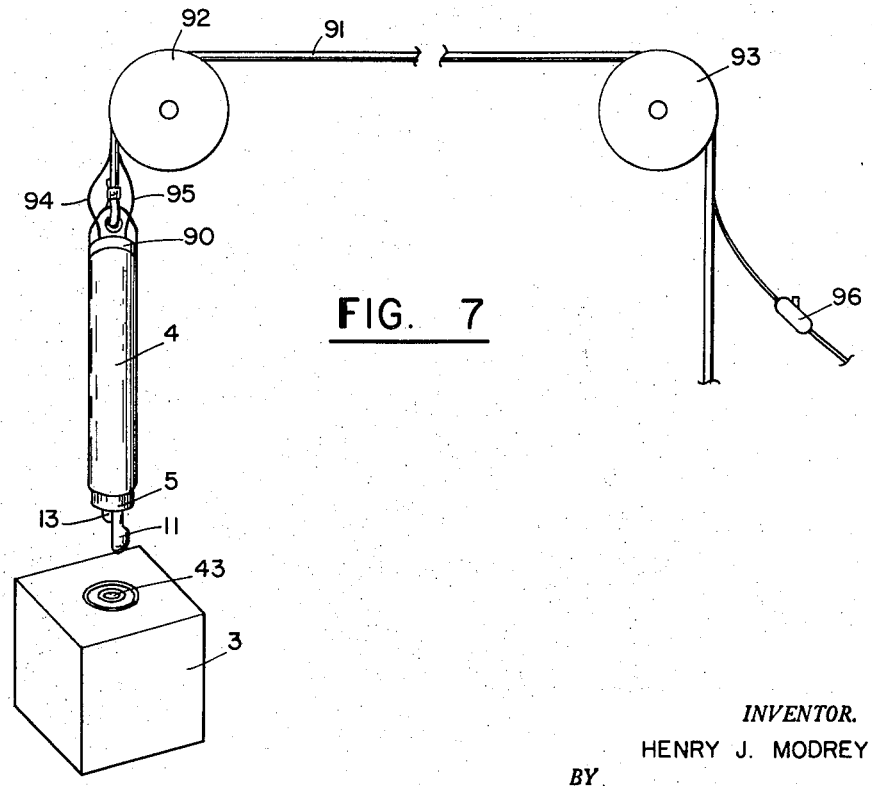
Fig. 7 is a diagrammatic view of a load carrier according to the invention and a remote control arrangement therefor.

Fig. 7 shows an installation for controlling a load carrier such as shown in Fig. 3 from a remote point. The clamping head and the locking slide are of the design shown in Fig. 3 but as is evident, they may also be designed as shown in Fig. 5. Furthermore, the clamping rod, the clamping head and the coacting tubular portion may be designed as shown in Fig. 6. The receiver on the load is shown in a simplified form in that the receiver opening 43 is formed directly in the top wall of load 3, but any of the receiver designs shown in Figs. 1, 2, 4 and 5 may be used, or the receiver design of Fig. 6 if the locking mechanism is of the kind shown in this figure.

A ring 90 screwed upon the threaded bushing shown in Fig. 3 serves to hitch the load carrier to a carrying wire rope 91 which is diagrammatically shown as being guided over two pulleys 92 and 93. The two wires 94 and 95 connected to the terminals of solenoid coil 50 are latched to rope 91 and the connection of the wires to a suitable source of current (not shown) includes a switch 96 which may be located at any convenient point remote from load 3. The coil is shown as being energized, that is, locking slide 13 is withdrawn relative to clamping head 11. In order to lock the carrier to the load it is merely necessary to lower the carrier so that the clamping head will pass through the receiver opening by gravity. When the coil is now de-energized, the locking slide will be snapped forward by the action of springs 16 and/or 20, thus locking the carrier to the load. The carrier can now be transported to the desired location, at which it is released by reenergizing coil 50. The manner in which the load is moved from one location to another is not shown in Fig. 7 but means suitable for the purpose are evident. As the locking action is effected by de-energization of the coil, a power failure while the load is in transit will have no effect upon the locking action.

Figure 8:
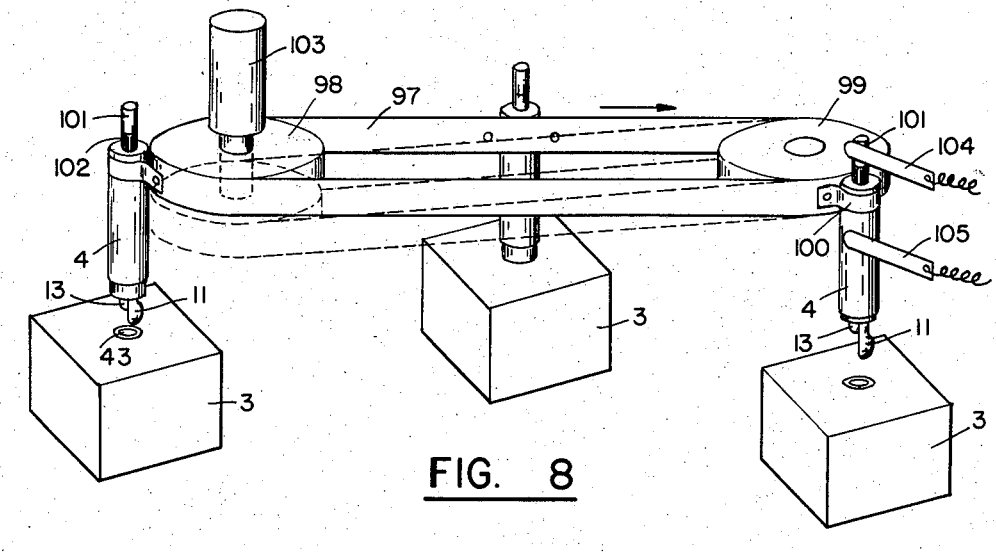
Fig. 8 is a diagrammatic view of a conveyor system in which carriers according to the invention are utilized for carrying successive loads from a loading station to a discharge station.

Fig. 8 shows a conveyor system for transporting loads successively from one or several loading stations to one of several deposit stations. To simplify the illustration, one loading station is shown at the left hand end of the figure, and a deposit or release station at the right hand end of the figure. The conveyor system is shown diagrammatically as comprising an endless conveyor belt 97 guided over two pulleys 98 and 99. Pulley 99 may be driven by any suitable drive means well known for the purpose. One or several load carriers substantially of the electrically operated design shown in Fig. 3 are secured to belt 97 by any suitable means diagrammatically indicated as clamps 100. Each of the load carriers depends from the belt in perpendicular position. The design of Fig. 3 is modified in that wire 57 of this figure is connected to a contact ring 101 insulated from tube 4 by insulation 102. The second wire 95 of the coil is connected to tube 4 as described in connection with Fig. 3. To move a load carrier which has arrived at the loading station and is shown above a load 3 to be lifted into locking engagement with the load, the belt portion just passing over pulley 98 can be lowered. To this end, a servo-system coacting with pulley 98 is diagrammatically indicated by a servo-cylinder 103. The servo-system when actuated will lower the belt from the full line position to the dotted line position. As is evident, various other means to lower or raise the respective belt portion may be provided, such as a suitable cam system of conventional design. It is also possible to mount the carriers so that they can be individually raised and lowered relative to the belt when in the loading station. When the carrier, or more specifically the clamping head 11 and the locking slide thereof are pressed into the receiver opening 43 on the load, the carrier will lock itself to the load as has been previously described. As has also been previously described, the carrier can lift the load only when its locking mechanism is correctly and fully locked to the load. If for any reason the locking mechanism does not function, the carrier will simply be pulled out of the load when pulley 98 is raised again so that there is no danger that a carrier will lift a load and drop it at any point between the loading station and the release station.

When a load carrier arrives at the release station, contact ring 101 and tube 4 are engaged by contact fingers 104 and 105 which should be visualized as being connected to a suitable source of current. As a result, coil 50 is energized whereby the carrier is released as previously described. In the system of Fig. 8 a power failure will also have no effect upon a loaded carrier.

Fig. 8 shows the coil of the carrier in the release station as being energized so that the clamping head 11 and the locking slide 13 occupy the same relative position as in Fig. 3.

The locking mechanism of the carrier used in the conveyor system of Fig. 8 may of course also be designed as shown in Figs. 4, 5 and 6.

While the invention has been described in detail with respect to certain now preferred examples and embodiments of the invention, it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. In a remote controlled load carrying assembly, a load carrier adapted to be locked to a receiver at the load to be carried, said load carrier comprising an outer sleeve, an inner sleeve within the outer sleeve, a clamping rod within the inner sleeve fixedly secured to the outer sleeve, said clamping rod terminating at one end in a clamping head one-sidedly overhanging the clamping rod and protruding from said inner and outer sleeves, said inner sleeve being slidable relative to the outer sleeve and the clamping rod and supporting at its end adjacent to the clamping head a centering means which in a forward position of the inner sleeve relative to the clamping head constitutes, in conjunction with the clamping head, a centering and locking structure for locking the carrier to the receiver centered relative thereto, and release means for retracting the inner sleeve in unison with said centering means from said forward position, said release means comprising a motion transmitting member extending within the outer sleeve and secured to the inner sleeve at the end thereof opposite said centering means and means spaced apart from said inner sleeve to apply an axial pull to said member for retracting the inner sleeve from said forward position.

2. In a remote controlled load carrying assembly, a load carrier adapted to be locked in an opening of a receiver at the load to be carried, said load carrier comprising an outer sleeve, an inner sleeve within the outer sleeve, a clamping rod within the inner sleeve fixedly secured to the outer sleeve, said clamping rod terminating at one end in a clamping head one-sidedly overhanging the clamping rod and protruding from said inner and outer sleeve, said inner sleeve being longitudinally slidable relative to said outer sleeve and said clamping rod, a centering and locking slide retained by the inner sleeve at one end thereof and disposed alongside the clamping rod and head on the side of the latter opposite said overhang, said centering and locking slide in a position substantially juxtaposed to the clamping head constituting in conjunction with the latter, a structure for locking the carrier in the receiver opening coaxially therewith, and release means for retracting the inner sleeve in unison with said slide from said locking position, said release means comprising a motion transmitting member extending within the outer sleeve and secured to the inner sleeve at the end thereof opposite said slide and means spaced apart from said inner sleeve to apply an axial pull to said member for retracting the inner sleeve from said forward position.

3. In a remote controlled load carrying assembly, a load carrier adapted to be locked in an opening of a receiver at the load to be carried, said load carrier comprising an outer sleeve, an inner sleeve within the outer sleeve, a clamping rod within the inner sleeve fixedly secured to the outer sleeve, said clamping rod terminating at one end in a clamping head one-sidedly overhanging the clamping rod and protruding from said inner and outer sleeve, said inner sleeve being longitudinally slidable relative to said outer sleeve and said clamping rod, a centering and locking slide retained by the inner sleeve at one end thereof and disposed alongside the clamping rod and head on the side of the latter opposite said overhang, said centering and locking slide in a position substantially juxtaposed to the clamping head constituting, in conjunction with the latter, a structure for locking the carrier in the receiver coaxially therewith, and release means for retracting the inner sleeve and with it the slide from said locking position juxtaposed to the clamping head, said release means comprising a motion transmitting member within the outer sleeve and secured at one end thereof to the inner sleeve at the end of the latter opposite the end retaining said slide, and actuating means secured to the other end of said motion transmitting member and operable from the outside of said outer sleeve to apply an axial pull to said member for retracting the slide from said juxtaposed position.

4. An assembly according to claim 3 wherein said centering and locking slide is fixedly secured to the inner sleeve and wherein a first and a second spring means independently urge said inner sleeve toward the position in which said slide is in said locking position juxtaposed to the clamping rod.

5. An assembly according to claim 4 wherein said clamping rod is formed with a longitudinal recess, said first spring means being disposed in said recess abutting against the centering and locking slide and a wall portion of the clamping rod defining said recess and said second spring means being disposed within the outer sleeve abutting against the end of the inner sleeve opposite to the locking slide and a projection formed within the outer sleeve.

6. An assembly according to claim 3, wherein said outer sleeve is longitudinally slotted, and wherein said actuating means comprise a release member secured to said motion transmitting member and protruding from the sleeve slot for retracting the inner sleeve and displacing said release member along said slot.

7. An assembly according to claim 6, wherein said release member comprises a ring connected through said sleeve slot to the motion transmitting member and longitudinally slidable along the outer sleeve.

8. An assembly according to claim 3, wherein said motion transmitting member comprises a wire rope extending within the outer sleeve and anchored to the inner sleeve.

9. An assembly according to claim 3, wherein said actuating means comprise an electro-magnetic means including a solenoid coil secured to the outer sleeve and a core movable in unison with said motion transmitting member, energization of said coil attracting the core and with it the inner sleeve and the slide into a position retracted from the locking position.

10. An assembly according to claim 9 wherein said solenoid coil is secured within the outer sleeve, and wherein the energizing circuit for said coil is controllable remote from said load carrier.

11. An assembly according to claim 9, wherein said motion transmitting member comprises a rigid rod anchored to the respective end of the inner sleeve and the core respectively.

12. An assembly according to claim 2, wherein said inner sleeve has an apertured end wall, said clamping head protruding from said end wall aperture and said slide being slidably extended through the end wall aperture alongside the clamping head and formed with a shoulder within the inner sleeve to retain the slide within said sleeve and wherein a spring means within the inner sleeve abuts against the said shoulder of the slide to urge the slide toward its position alongside the clamping head.

13. An assembly according to claim 1, wherein said inner sleeve has a tubular extension reduced in peripheral outline relative to the sleeve proper, said clamping head protruding from the extension overhanging the peripheral outline thereof, said extension constituting said centering means.

14. A conveyor system for carrying a load from a loading station to a release station, said system comprising a conveyor means travelling between said two stations, a self-locking load carrier as defined in claim 1 mounted on said conveyor means for travel in unison therewith, loading means in the loading station for moving the carrier upon arriving in said station into locking engagement with a receiver on the load to be carried, and discharge means in the release station engaging the release means of the loaded carrier when in said station for releasing the load therefrom.

15. A conveyor system according to claim 14, wherein said loading means comprise means for moving the load carrier when in the loading station from a path of travel spaced apart from the load to be carried into a position of self-locking engagement with the load.

16. A conveyor system for carrying a load from a loading station to a release station, said system comprising a conveyor means travelling between said two stations, a self-locking load carrier as defined in claim 9 mounted on said conveyor means for travel in unison therewith, loading means in the loading station for moving a carrier arriving in said station into locking engagement with a receiver on the load to be carried, and discharge means in the release station coacting with the loaded carrier arriving in said station to release the load therefrom, said discharge means including energizing circuit means and contact means engaging the carrier in the release station to close an energizing circuit for the coil of the carrier, energization of said coil effecting the release of the load.

References Cited in the file of this patent

UNITED STATES PATENTS

| | | |
|---|---|---|
| 2,464,543 | Modrey | Mar. 15, 1949 |
| 2,465,328 | Modrey | Mar. 22, 1949 |